United States Patent Office 3,040,029
Patented June 19, 1962

3,040,029
PREPARATION OF HOMOPIPERAZINE AND ALKYL-SUBSTITUTED DERIVATIVES THEREOF
Fédor Poppelsdorf, Charleston, and Richard C. Myerly, South Charleston, W. Va., assignors to Union Carbide Corporation, a corporation of New York
No Drawing. Filed Jan. 27, 1960, Ser. No. 4,892
10 Claims. (Cl. 260—239)

This invention relates, in general, to a novel process for the preparation of heterocyclic nitrogen-containing compounds. In one aspect, this invention relates to a novel process for the synthesis of homopiperazine and alkyl-substituted derivatives thereof.

Due to the outstanding and desirable physiological characteristics of the derivatives of 1-methylhomopiperazine, the methyl-substituted homopiperazines are currently of interest as pharmaceutical intermediates. For example, the works of A. H. Sommers, R. J. Michaels, Jr. and A. W. Weston, J. Am. Chem. Soc., 76, 5805 (1954), J. W. Reinertson and P. E. Thompson, Antibiotics and Chemotherapy, 5, 566 (1955) and P. Brookes, R. J. Terry, and J. Walker, J. Chem. Soc., 3165 (1957) indicate the desirable physiological activities of the derivatives of 1-methylhomopiperazine.

These desirable features have stimulated a search for a commercially feasible synthetic route for the preparation of homopiperazine and its alkyl-substituted derivatives from inexpensive and readily available raw materials.

Heretofore, among the known syntheses previously disclosed in the literature for the preparation of homopiperazine was the early work of L. Bleier, Ber., 32, 1825 (1899) and C. C. Howard and W. Marckwald, Ber., 32, 2038 (1899). Both methods were tedious, cumbersome and either impractical or too expensive for large scale operation. In essence, these methods involved a multistep process beginning with the treatment of ethylenediamine with an aryl sulfonyl halide under basic conditions, to form a N,N'-diarylsulfonylethylenediamine; thereafter heating the disodium salt of the N,N'-diarylsulfonylethylenediamine with a 1,3-dihalogenopropane to give N,N'-diarylsulfonylhomopiperazine, acid hydrolysis to the crude homopiperazine hydrochloride; and thereafter recovering and purifying the homopiperazine. A more recent method reported by T. Ishiguro and M. Matsumura, Chem. Abstr., 53, 13163 (1959) described the preparation of homopiperazine by the catalytic cyclodehydration of N(2'-hydroxyethyl)-1,3-propanediamine in over-all yields of from 7.7 to 10.5 percent based on the ethanolamine starting material.

The alkyl-substituted derivatives have been prepared by methods involving ring closure or by ring enlargement based on a Schmidt-type rearrangement. For example, 1-methylhomopiperazine has been synthesized by a Schmidt-type rearrangement of 1-methyl-4-piperidone followed by a lithium aluminum hydride reduction of the homopiperazinone formed:

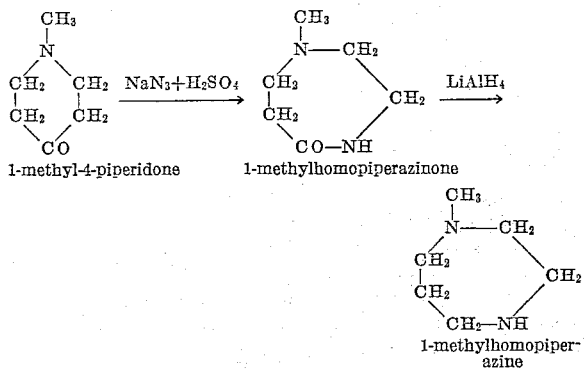

1-methyl-4-piperidone
1-methylhomopiperazinone
1-methylhomopiperazine

Inasmuch as the piperidone starting material is an expensive intermediate requiring at least three steps to prepare, this procedure would undoubtedly be very costly and unsuitable for large scale production.

Other syntheses of the alkyl-substituted derivatives of homopiperazine have also been proposed such as the aforementioned work of T. Ishiguro and M. Matsumura which also discloses the preparation of 1-methylhomopiperazine by the catalytic reductive cyclization of N(2'-hydroxyethyl)-N-methyl-1,3-propanediamine. However, for a variety of reasons these methods suffer from the disadvantage of mediocre yields or of being based on relatively inaccessible starting materials. Moreover, due to the limited stability of homopiperazine and the fact that other nitrogen-containing heterocyclic compounds of similar ring size cannot be prepared efficiently by the same methods applicable for the five and six membered cyclic analogues, the novel synthetic route of the present invention, as hereinafter described, was indeed unexpected and surprising.

Accordingly, one or more of the following objects will be achieved by the practice of the instant invention. It is an object of the present invention to provide a simple and practical procedure for the preparation of homopiperazine and its alkyl-substituted derivatives wherein the disadvantages hereinbefore enumerated are substantially eliminated. A further object of the present invention is to provide a process for the preparation of homopiperazine which is practical, economical, and affords reasonable yields. Another object is to provide a novel process which employs readily available and inexpensive raw materials. A further object is to provide a process for the preparation of homopiperazine from N(2-cyanoethyl)ethylenediamine. A still further object is to provide a process for the preparation of an alkyl-substituted homopiperazine from an alkyl-substituted N(2-cyanoethyl)ethylenediamine. Another object is to provide a process for the preparation of homopiperazine which involves the reductive cyclization of N(2-cyanoethyl)ethylenediamine. A further object of the present invention is to prepare novel composition of matter comprising the 2-methyl-, 5-methyl- and 6-methyl-homopiperazines. These and other objects will readily become apparent to those skilled in the art in the light of the teachings herein set forth.

A broad aspect of this invention is directed to a process for the preparation of homopiperazine and alkyl-substituted derivatives thereof which comprises the reductive cyclization of an N(2-cyanoethyl)ethylenediamine in the presence of a nickel-containing catalyst to form the homopiperazine or alkyl-substituted derivative thereof, and thereafter recovering the homopiperazine compound.

The aforementioned process provides a novel method for the preparation of homopiperazine and its alkyl-substituted derivatives. The novel process of the present invention can be conveniently illustrated by the following equation:

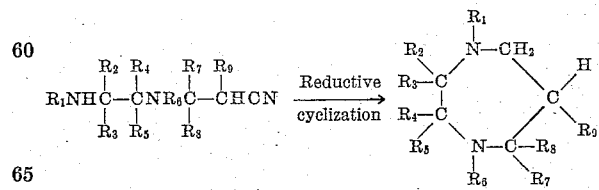

wherein $R_1$–$R_9$ are members selected from the group consisting of hydrogen and saturated aliphatic groups containing from 1 to 11 carbon atoms, with the provision that two (R)s on adjacent carbon atoms can be part of the same alicyclic ring system. Preferred compounds prepared by the process of the present invention are those compounds illustrated by the aforementioned formulae wherein $R_1$–$R_9$ are hydrogen, alkyl groups containing from 1 to 4 carbon atoms, or substituted alkyl groups containing from 4 to 11 carbon atoms with the provision that two (R)s on adjacent carbon atoms can be part of the same alicyclic ring system. Preferred compounds prepared by the process of the present invention are those compounds illustrated by the aforementioned formulae wherein $R_1$–$R_9$ are hydrogen or alkyl groups containing from one to four carbon atoms. Particularly preferred compounds prepared in accordance with the teachings of this invention, in addition to homopiperazine, are the monomethyl and dimethyl derivatives. While the alkyl groups are preferably unsubstituted, it is possible to have substituents on these groups, the only requirement being that they do not interfere with the reductive cyclization nor react adversely with other groups present. For example, N(2-cyanoethyl)ethylenediamines containing alkyl groups branched at a position alpha to the point of attachment or containing other substituents attached to the alkyl group at a position alpha to the point of attachment are undesirable for the purposes of the invention. Consequently, the alkyl derivatives of homopiperazine can contain such groups as $R_{10}OCH_2CH_2$-, $(R_{10})_2NCH_2CH_2CH_2$-, and the like, wherein $R_{10}$ is an alkyl group containing from 1 to 4 carbon atoms.

The novel process of the present invention can therefore be utilized in the preparation of such compounds as:

homopiperazine,
1-methylhomopiperazine,
2-methylhomopiperazine,
5-methylhomopiperazine,
6-methylhomopiperazine,
1-ethylhomopiperazine,
2-ethylhomopiperazine,
5-ethylhomopiperazine,
6-ethylhomopiperazine,
1-propylhomopiperazine,
1-butylhomopiperazine,
2-butylhomopiperazine,
1,2-dimethylhomopiperazine,
1,3-dimethylhomopiperazine,
1,4-dimethylhomopiperazine,
1,5-dimethylhomopiperazine,
1,6-dimethylhomopiperazine,
4,5-dimethylhomopiperazine,
2,3-dimethylhomopiperazine,
2,5-dimethylhomopiperazine,
2,6-dimethylhomopiperazine,
3,5-dimethylhomopiperazine,
5,6-dimethylhomopiperazine,
2,2-dimethylhomopiperazine,
5,5-dimethylhomopiperazine,
1-methyl-2-ethylhomopiperazine,
1-methyl-5-propylhomopiperazine,
1-ethyl-4-butylhomopiperazine,
2-methyl-3-propylhomopiperazine, and the like.

In accordance with the process of the present invention the N(2-cyanoethyl)ethylenediamine starting material undergoes a reductive cyclization to the corresponding homopiperazine or alkyl-substituted derivative thereof. By "reductive cyclization" as employed in the specification and appended claims is meant that process whereby the N(2-cyanoethyl)ethylenediamine undergoes an intramolecular reaction, under the conditions hereinafter described, to produce a heterocyclic compound, i.e., homopiperazine or its alkyl-substituted derivatives.

While not wishing to be bound by any particular theory, there are at least two possible mechanisms by which the reductive cyclization reaction can occur. Firstly, the interaction of one molecule of hydrogen and one molecule of the N(2-cyanoethyl)ethylenediamine could give the imine (I). The imine could thereafter undergo an intramolecular cyclization reaction with the displacement of a molecule of ammonia to form an unsaturated compound (II), which upon reduction would give homopiperazine (III):

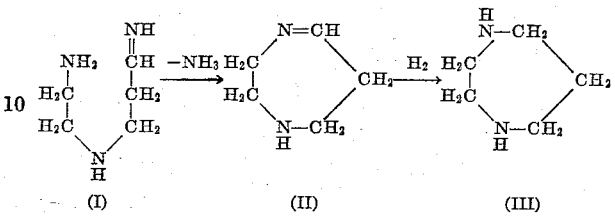

Secondly, the imine (I) could form an amino-substituted homopiperazine (IV) by an addition-cyclization reaction, which upon hydrogenolysis would give homopiperazine (III):

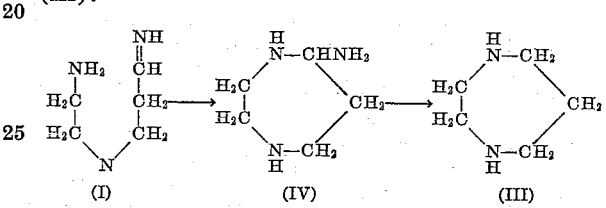

The aforesaid reactions are given only for the purposes of aiding in understanding and demonstrating the possible scope of the reductive cyclization process and not as an acceptance of one or another reaction pathway as the preferred mechanism. It should be noted that while the reductive cyclization can possibly take place by one of the above mechanisms or a combination thereof, no unnecessary limitations or inferences are to be drawn therefrom regarding this aspect of the invention.

While the aforesaid reactions have illustrated the preparation of homopiperazine, the alkyl-derivatives can be prepared in a similar fashion. Thus, reference to the process for the preparation of homopiperazine is equally applicable to the preparation of the alkyl-substituted derivatives, unless otherwise stated.

The reductive cyclization process of the present invention, is influenced by several process variables, each of which will be considered in its relation to the preparation of homopiperazine and derivatives thereof from the corresponding N(2-cyanoethyl)ethylenediamine.

The effectiveness of several hydrogenation catalysts was investigated to determine those capable of effecting the desired reductive cyclization reaction. In practice, it was discovered that only nickel-containing catalysts proved capable of bringing about the desired cyclization. The specificity of nickel-containing catalysts for the reductive cyclization process, particularly when employed as a supported nickel catalyst, was entirely unforeseen and unexpected. Suitable catalysts applicable for use in the process of the present invention include nickel, Raney nickel, supported nickel and supported nickel-containing catalysts. For example, supported nickel catalysts include, among others, nickel on kieselguhr, nickel on fuller's earth, nickel on clay, and the like. Preferred catalysts applicable for use in the present invention consist of reduced and stabilized nickel on a kieselguhr support, particularly those containing from about 50 to about 65 weight percent of nickel. A particularly preferred catalyst consists of reduced and stabilized nickel on a kieselguhr support containing approximately 65 percent by weight of nickel.

Catalyst concentrations of from about 1 to about 50 weight percent of the reaction charge or from about 1 to about 100 weight percent of the N(2-cyanoethyl)-ethylenediamine can be employed to effect reductive cyclization. However, in order to maximize the amount of the homopiperazine or its alkyl-substituted derivative, concentrations within the range of from about 2 to about 20 weight percent based on the cyano-compound are preferred. Particularly preferred catalyst concentrations applicable for the practice of the present invention are from about 5 to about 15 weight percent based on the cyano-compound. Concentrations above and below the aforementioned ranges can also be employed but are less preferred. Since the degree of cyclization will be influenced by the particular choice and concentration of the nickel-containing catalyst, the desired operating conditions for one catalyst may not necessarily be the same for another.

The use of an inert diluent for the reductive cyclization step is preferred, though not absolutely necessary. When the reaction was conducted in the absence of a diluent the yield was only 69 percent of that obtained under comparable conditions when a diluent was employed. The choice of diluent will largely be dependent upon its miscibility and non-reactivity with the reactants and other components of the system, its inability to cause undesirable decomposition of the starting materials, i.e. the cyano compounds and its ease of separation from the reaction products. Preferred diluents are those completely miscible with the reactants and products and which can be readily separated from the homopiperazine product and its aklyl derivatives by distillation. Illustrative of the diluents which can be utilized in the practice of this invention include, among others, ethers, alcohols, amines, and the like. For example, the cyclic ethers such as dioxane, tetrahydrofuran; the aliphatic ethers, such as diethyl ether, diisopropyl ether, dibutyl ether, 1,2-dimethoxyethane, 1,2-diethoxyethane; the aliphatic alcohols such as teritary butanol, secondary butanol, 2-propanol, tertiary amyl alcohol, methyl isobutyl carbinol; amines which will not undergo 1,4-addition to acrylonitrile such as, diisopropylamine, triethylamine, tributylamine, and the like. Of the aforementioned diluents, 2-propanol, tetrahydrofuran, and tertiary butanol are preferred. Tertiary butanol is particularly preferred insomuch as the highest yields of homopiperazine were obtained when it was used as the diluent.

In general, the proportion of diluent to the N(2-cyanoethyl)ethylenediamine starting material in parts by weight can vary from 0 to about 8 to 1. A preferred proportion found applicable for the instant process is from about 0.75 to 1, to about 1.5 to 1. When tertiary butanol was used as the diluent in an amount equal in weight to the N(2-cyanoethyl)ethylenediamine, an optimum yield of the homopiperazine product was obtained. A further increase of the proportion of diluent to cyano-compound to about 8 to 1 by weight, gave no further increase in the yield of homopiperazine.

In order to obtain the maximum yield of the homopiperazine product the most effective hydrogenating pressure, temperature and catalyst concentration necessary to effect reductive cyclization were determined. In practice, hydrogenating pressures of from 75 pounds per square inch gauge and higher, and reaction temperatures of from 80° C. and higher, are satisfactory to effect the desired intramolecular reaction. Preferred hydrogenating pressures can vary from about 130 to about 2,400 pounds per square inch gauge, and more preferably from about 650 to about 950 pounds per square inch gauge. Likewise the preferred reaction temperatures can vary from about 115° to about 135° C. As indicated in Table I, the optimum yield of homopiperazine was obtained when the reaction temperature was approximately 130° C., the hydrogenating pressure was between about 650 and about 950 pounds per square inch gauge and the catalyst concentration was 5 weight percent based on the total reaction charge.

TABLE I

*Variation of the Yield of Homopiperazine With Hydrogenating Pressure* [a]

| Hydrogenating Pressure, p.s.i.g. | Hydrogenation Time, Minutes | Percent Yield of Homopiperazine [b] |
|---|---|---|
| 130–150 | 655 | 14.0 |
| 250–300 | 240 | 25.2 |
| 400–450 | 195 | 26.0 |
| 650–950 | 156 | 32.4 |

[a] The experiments listed in Table I were done by continuously feeding 200.0 grams of N(2-cyanoethyl)ethylenediamine at the rate of 30 percent per hour into a mixture of 200.0 grams of anhydrous tertiary butanol and 20 grams of a nickel on kieselguhr catalyst (65 percent nickel) kept in a three liter stirred autoclave at 130° C. under the hydrogenating pressure quoted.
[b] Based on acrylonitrile.

The hydrogenating pressure required for the maximum yield is a function of the particular reaction temperature and catalyst concentration. For example, at a reaction temperature of 130° C. with a catalyst concentration of 5 weight percent, reductive cyclization was effected satisfactory within a hydrogenating pressure range of from about 130 to about 2,400 pounds per square inch gauge. However, the uptake of hydrogen took 4.7 times as long within the 130 to 150 p.s.i.g. range as within the 650 to 950 p.s.i.g. range, while the yield of homopiperazine was but 43 percent of that at the higher pressure range. In contrast, at a reaction temperature of 115° C. and with the same catalyst concentration, reductive cyclization took place very slowly at pressures within the range of from 300 to 550 p.s.i.g., the total uptake of hydrogen being about one third of the theoretical value.

Although the technique for effecting the reductive cyclization process of the present invention is not necessarily critical, the optimum yield of the homopiperazine product is obtained by the gradual addition of the N(2-cyanoethyl)ethylenediamine compound to a mixture of diluent and catalyst, the mixture being maintained at the desired temperature and hydrogen pressure. This method is in preference to mixing all of the components of the reaction and thereafter raising the temperature and pressure. Thus, when the N(2-cyanoethyl)ethylenediamine compound was gradually added to an autoclave containing the reactants kept at the desired temperature under hydrogen pressure at a rate of from about 15 to about 30 weight percent per hour, the yield of product was increased by about 33 percent over that obtained by the less preferred method. In either case the reactants will undergo the reductive cyclization reaction but with varying degrees of efficiency.

The contact time necessary to effect the novel process of the present invention need only be of such duration as to insure optimum conversion of the N(2-cyanoethyl)-ethylenediamine to the corresponding homopiperazine. Generally, after all of the nitrile has been added and the absorption of hydrogen has ceased, the reaction is essentially complete. It has been noted that the uptake of hydrogen ceases just after all the nitrile has been introduced into the autoclave.

The starting materials of the present invention are the corresponding N(2-cyanoethyl)ethylenediamines which were prepared by the interaction of the appropriate diamines and unsaturated nitriles as illustrated by the following equation:

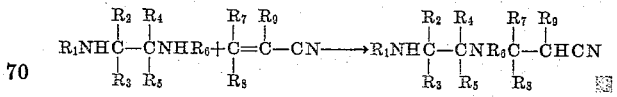

wherein $R_1$–$R_9$ have the same value as previously indicated. For example, the addition of acrylonitrile to ethylenediamine forms the N(2-cyanoethyl)ethylenediamine starting material for homopiperazine. In a similar manner, the corresponding starting materials for the alkyl-substituted homopiperazines can also be prepared. Analyses and physical characteristics of the methyl-substituted N(2-cyanoethyl)ethylenediamine starting material are tabulated in Table II and the corresponding methyl-substituted homopiperazines are tabulated in Table III:

TABLE II

*Methyl-Substituted N(2-Cyanoethyl)Ethylenediamines*

| Formula | Boiling Point or Melting Point °C./mm. | Refractive Index $n_D^{30}$ | Analyses | | | | | |
|---|---|---|---|---|---|---|---|---|
| | | | Calculated, percent | | | Found, percent | | |
| | | | C | H | N | C | H | N |
| $H_2NCH_2CH_2N(CH_3)CH_2CH_2CN$ [a] | 72/0.3 | 1.4628 | 56.7 | 10.3 | 33.0 | 57.0 | 10.6 | [d] 32.8 |
| $H_2NCH_2CH_2NHCH(CH_3)CH_2CN$ | 96.5/0.77 | 1.4705 | 56.7 | 10.3 | 33.0 | 57.0 | 10.6 | 32.2 |
| Dipicrate ($C_{18}H_{19}N_9O_{14}$) [b] | 179–180 | | | | 21.5 | | | 21.5 |
| $H_2NCH_2CH_2NHCH_2CH(CH_3)CN$ | 77/0.2 | 1.4635 | 56.7 | 10.3 | 33.0 | 56.5 | 10.6 | 33.4 |
| Dipicrate ($C_{18}H_{19}N_9O_{14}$) [b] | 187–188 | | | | 21.5 | | | 21.7 |
| $H_2NCH(CH_3)CH_2NHCH_2CH_2CN$ [c] $H_2NCH_2CH(CH_3)NHCH_2CH_2CN$ | 80.5/0.2 | 1.4635 | 56.7 | 10.3 | 33.0 | 56.8 | 10.8 | 33.2 |

[a] Contained about 5% of the isomer $CH_3NHCH_2CH_2NHCH_2CN$.
[b] Prepared in, and recrystallized from ethanol.
[c] Mixture of isomers.
[d] Calcd.: $NH_2$, 12.6. Found: $NH_2$ by the method of Critchfield and Johnson, Anal. Chem 29, 1174 (1957), 11.9.

TABLE III

*The Monomethylhomopiperazines and Their Picrates* [a]

| Position of Methyl Group | Yield percent [b] | Boiling Point or Melting Point, °C./mm. | Refractive Index, $n_D^{30}$ | Formula | Analyses | | | | | |
|---|---|---|---|---|---|---|---|---|---|---|
| | | | | | Calculated, percent | | | Found, percent | | |
| | | | | | C | H | N | C | H | N |
| 1 | 16.8 | 164/754 | 1.4769 | $C_6H_{14}N_2$ | | | 24.5 | | | [g] 24.4 |
| Dipicrate | | 245, dec. [c], [d] | | $C_{18}H_{20}N_8O_{14}$ | | | 19.7 | | | 19.3 |
| 2 | 8.3 | [e] 175–175.5/752 | [f] 1.4802 | $C_6H_{14}N_2$ | 63.1 | 12.4 | 24.5 | 62.7 | 12.7 | 24.2 |
| Dipicrate | | 278, dec. | | $C_{18}H_{20}N_8O_{14}$ | | | 19.7 | | | 19.9 |
| 5 | 38.7 | 175–175.4/745 | 1.4843 | $C_6H_{14}N_2$ | 63.1 | 12.4 | 24.5 | 63.2 | 12.2 | 24.5 |
| Dipicrate | | 256, dec. | | $C_{18}H_{20}N_8O_{14}$ | | | 19.7 | | | 19.9 |
| 6 | 20.6 | 181–181.3/755 | 1.4869 | $C_6H_{14}N_2$ | 63.1 | 12.4 | 24.5 | 62.9 | 12.4 | 24.5 |
| Dipicrate | | 255–256, dec. | | $C_{18}H_{20}N_8O_{14}$ | | | 19.7 | | | 19.5 |

[a] The picrates were prepared in, and recrystallized from, water.
[b] Over-all, based on the unsaturated nitriles.
[c] Reported M.P. 242–243°, dec.
[d] Reported M.P. 233–234°.
[e] M.P. 28°.
[f] Value determined at 30°.
[g] Calcd: tertiary-amino N, 12.3. Found: Tertiary amino N [by the method of Critchfield, Funk, and Johnson], Anal. Chem., 2876 (1956), 12.3.

The process of the present invention is applicable to both batch and continuous type operations. For instance, the reaction can be conducted batchwise in autoclaves or in a continuous manner by means of a tubular or tank reactor. When operating a continuous process the N(2-cyanoethyl)ethylenediamine compound can be gradually added to the reaction system at a plurality of points along the reaction zone. Moreover, all or some of the reactants can be separately preheated and brought to the proper hydrogenating pressure prior to contact with the catalyst. Inasmuch as the formation of a secondary amine from two molecules of a nitrile by reduction involves the formation of one molecule of ammonia, it has been found desirable, although not necessary, to purge the reaction zone with hydrogen. This practice resulted in an increased yield of the homopiperazine product.

The following examples are illustrative:

EXAMPLE I

*Preparation of Homopiperazine*

93.8 grams of acrylonitrile were gradually added while stirring and cooling to 425.0 grams of anhydrous ethylenediamine which was kept under an atmosphere of dry nitrogen. The temperature of the mixture was maintained between 20° and 30° C. throughout the addition of the acrylonitrile. After being stirred for 15 minutes, the mixture was evaporated in a current of dry nitrogen at a temperature below 70° C. under a reduced pressure of from 30 to 5 millimeters of mercury. This operation was continued until the residue no longer lost weight. 318.0 grams of unchanged ethylenediamine were recovered and there remained 200.0 grams of N(2-cyanoethyl)ethylenediamine as a straw-colored oil.

200 grams of anhydrous tertiary butanol and 20.0 grams of a reduced and stabilized nickel on kieselguhr catalyst (65 weight percent nickel) were added to a stainless steel autoclave having a capacity of three liters and equipped with a stirring device. The free space was purged of air with hydrogen, then the pressure in the autoclave was increased to 700 pounds per square inch gauge by the addition of hydrogen. The autoclave and its contents were heated to 130° C. whereupon 200.0 grams (203 cc.) of N(2-cyanoethyl)ethylenediamine were introduced therein by a proportioning pump at a feed rate of one cubic centimeter per minute (29.6 percent by volume per hour), this rate being maintained throughout the addition. Absorption of hydrogen took place smoothly and regularly and was complete at the end of the feed period. During the reaction the temperature was kept at 130° C. and the hydrogenating pressure at 650 to 950 pounds per square inch gauge. These conditions were maintained for one and one-half hours after all the cyano-compound had been added. After being filtered free from the catalyst, the reaction product was distilled. The fraction having a boiling point of 168° C. at a pressure of 750 millimeters of mercury was substantially pure homopiperazine (57.3 grams) having a freezing point of 43° C. The yield was 32.4 percent of the theoretical based on acrylonitrile.

EXAMPLE II

*Preparation of Homopiperazine*

The procedure of Example I was repeated with the substitution of 20.0 grams of an aqueous Raney nickel sludge for the nickel on kieselguhr catalyst. There was obtained 8.4 grams of homopiperazine which represented a yield of 4.8 percent of the theoretical.

EXAMPLE III

*Preparation of 1-Methylhomopiperazine*

89.6 grams of acrylonitrile were gradually added while stirring and cooling to 501.4 grams of anhydrous N-methylethylenediamine which was kept under an atmosphere of dry nitrogen. The temperature of the mixture was maintained between 20° and 30° C. throughout the addition of the acrylonitrile. After being kept at room temperature for three days, the mixture was evaporated in a current of dry nitrogen at a temperature below 80° C. and under a reduced pressure of from 30 to 2 millimeters of mercury. 362.6 grams of unchanged N-methylethylenediamine were recovered and there remained 214.8 grams of N(2-cyanoethyl)-N-methylethylenediamine as an almost colorless oil.

Analysis specific for primary and tertiary amino groups showed that the residual product consisted predominantly of the isomer having the structure:

This residual product, a portion of which purified for analysis by distillation had a boiling point of 72° C. at a pressure of 0.3 millimeter of mercury and a Refractive Index, $n_D^{20}$, of 1.4628, was employed for the reductive cyclization stage without further purification.

125.0 grams of anhydrous tertiary butanol, 125.0 grams of the N(2-cyanoethyl)-N-methylethylenediamine and 12.5 grams of the same nickel on kieselguhr catalyst employed in Example I were added to a stainless steel autoclave having a capacity of three liters and equipped with a stirring device. The free space was purged of air with hydrogen then the pressure of the autoclave was increased to 700 pounds per square inch gauge by the further addition of hydrogen. The autoclave and its contents were heated to 130° C. and kept at this temperature at a hydrogenating pressure of from 600 to 950 pounds per square inch gauge until uptake of hydrogen had ceased. The pressure and temperature were maintained for an additional three hours. After being filtered free from hte catalyst the reaction product was distilled. 18.8 grams of 1-methylhomopiperazine were obtained as a colorless liquid having a boiling point of 164° C. at a pressure of 754 millimeters of mercury and a Refractive Index, $n_D^{20}$, of 1.4769. The yield of 1-methylhomopiperazine was 16.8 percent of the theoretical value based on acrylonitrile.

EXAMPLE IV

*Preparation of 2-Methylhomopiperazine*

2,372 grams of 1,2-propanediamine having a purity of 96.5 percent were treated with 424 grams of acrylonitrile in the same manner as described in the Example I. There was obtained 1,677 grams of unchanged 1,2-propanediamine and 1,019 grams of N(2'-cyanoethyl)-1,2-propanediamine as a residual product. The cyanoethylated substance probably consisted of a mixture of the followig isomeric nitriles:

and

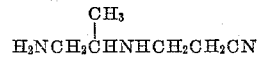

A sample prepared for analysis had a boiling point of 80.5° C. at a pressure of 0.2 millimeter of mercury.

225.0 grams of the unrefined residual N(2'-cyanoethyl)-1,2-propanediamine were subjected to reductive cyclization in the presence of 22.5 grams of the aforementioned nickel on kieselguhr catalyst and under the identical conditions employed in Example I. After being filtered free from the catalyst, the reaction product was distilled. 16.7 grams of 2-methylhomopiperazine were obtained as a colorless liquid having a boiling point of from 175° to 175.5° C. at a pressure of 752 millimeters of mercury and a freezing point of 28° C. The Refractive Index, $n_D^{30}$, was 1.4802. The yield represented 8.3 percent of the theoretical based on acrylonitrile.

EXAMPLE V

*Preparation of 5-Methylhomopiperazine*

537 grams of crotononitrile were gradually added with stirring and occasional cooling to 1,923 grams of anhydrous ethylenediamine which was kept under an atmosphere of dry nitrogen. The temperature of the mixture was maintained between 50° and 60° C. throughout the addition of the crotononitrile. After being stirred for one hour at 50° C., the mixture was evaporated in a current of dry nitrogen at a temperature below 70° C. under a reduced pressure of from 30 to 5 millimeters of mercury. This operation was continued until the residue no longer lost weight. 1,457.5 grams of unchanged ethylenediamine were recovered and there remained 968.0 grams of N(1-methyl-2-cyanoethyl)ethylenediamine as a straw-colored oil. This residual product, a sample of which purified for analysis had a boiling point of 96.5° C. at a pressure of 0.77 millimeter of mercury and a Refractive Index, $n_D^{20}$, of 1.4705, was employed for the reductive cyclization stage without further purification.

225.0 grams of the unrefined residual N(1-methyl-2-cyanoethyl)ethylenediamine were subjected to reductive cyclization in the presence of 22.5 grams of the aforementioned nickel on kieselguhr catalyst and under the identical conditions employed in Example I. After being filtered free from the catalyst, the reaction product was distilled. 78.4 grams of 5-methyl-homopiperazine were obtained as a colorles liquid having a boiling point of from 175° to 175.4° C. at a pressure of 745 millimeters of mercury and a Refractive Index, $n_D^{20}$, of 1.4843. The yield represented 38.7 percent of the theoretical based on crotononitrile.

EXAMPLE VI

*Preparation of 6-Methylhomopiperazine*

537 grams of methacrylonitrile were gradually added while stirring over a period of 3 hours and 45 minutes to 1,923 grams of anhydrous ethylenediamine which was kept under an atmosphere of dry nitrogen. The temperature of the mixture was gradually raised from 10° to 86° C. during the addition of the methacrylonitrile. After being stirred at 100° C. for one-half hour, then refluxed for three hours, the mixture was evaporated in a current of dry nitrogen at a temperature below 70° C. and at a pressure of from 30 to 5 millimeters of mercury. This operation was continued until the residue no longer lost weight. Unchanged ethylenediamine was recovered and there remained 950.5 grams of a straw-colored oil which was N(2-methyl-2-cyanoethyl)ethylenediamine. This residual product, a portion of which purified for analysis had a boiling point of 77° C. at a pressure of 0.2 millimeters of mercury and a Refractive Index, $n_D^{20}$, of 1.4635, was employed for the reductive cyclization stage without further purification.

225.0 grams of the unrefined residual N(2-methyl-2-cyanoethyl)ethylenediamine were subjected to reductive cyclization in the presence of 22.5 grams of the aforementioned nickel on kieselguhr catalyst and under the identical conditions employed in Example I. After being filtered free from the catalyst, the reaction product was distilled. 41.7 grams of 6-methylhomopiperazine were obtained as a colorless liquid having a boiling point of from 181° to 181.3° C. at a pressure of 755 millimeters of mercury and a Refractive Index, $n_D^{20}$, of 1.4869. The yield represented 20.6 percent of the theoretical value based on methacrylonitrile.

In a manner similar to the aforementioned examples, the dimethylhomopiperazines can also be prepared from the appropriate starting material.

Although the invention has been illustrated with the preceding examples, the invention is not to be construed as limited to the materials employed in the above examples, but rather, the invention encompasses the generic area as hereinbefore disclosed. Various modifications and embodiments of this invention can be made without departing from the spirit and scope thereof.

What is claimed is:

1. A process for the preparation of a homopiperazine compound of the formula:

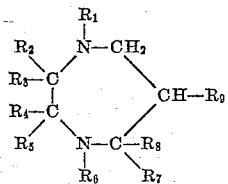

wherein $R_1$ through $R_9$ are members selected from the group consisting of hydrogen and unsubstituted saturated aliphatic of from 1 to 11 carbon atoms, which comprises the reductive cyclization of an N(2-cyanoethyl)ethylenediamine in the presence of hydrogen and a nickel-containing hydrogenation catalyst to form the said homopiperazine compound, and thereafter recovering the said homopiperazine compound.

2. A process for the preparation of homopiperazine compound of the formula of claim 1 wherein $R_1$ through $R_9$ are members selected from the group consisting of hydrogen and unsubstituted saturated aliphatic of from 1 to 11 carbon atoms, which comprises the reductive cyclization of an N(2-cyanoethyl)ethylenediamine under a pressure of from about 75 to about 2,400 pounds per square inch gauge in the presence of hydrogen, and a nickel-containing hydrogenation catalyst to form the said homopiperazine compound and thereafter recovering the said homopiperazine compound.

3. A process for the preparation of homopiperazine compound of the formula of claim 1 wherein $R_1$ through $R_9$ are members selected from the group consisting of hydrogen and unsubstituted saturated aliphatic of from 1 to 11 carbon atoms, which comprises the reductive cyclization of an N(2-cyanoethyl)ethylenediamine under a pressure of from about 75 to about 2,400 pounds per square inch gauge and a temperature of from about 80° to about 130° C. in the presence of hydrogen, and a nickel-containing hydrogenation catalyst to form the said homopiperazine compound and thereafter recovering the said homopiperazine compound.

4. A process for the preparation of dimethylhomopiperazine which comprises the reductive cyclization of an N(2-cyanoethyl)ethylenediamine under a pressure of from about 75 to about 2,400 pounds per square inch gauge and a temperature of from about 80° to about 130° C. in the presence of hydrogen, an inert diluent and from about 1 to about 100 weight percent based on the said N(2-cyanoethyl)ethylenediamine of a nickel-containing hydrogenation catalyst for a period of time to make optimum the conversion of the N(2-cyanoethyl)ethylenediamine to form the said dimethylhomopiperazine and thereafter recovering the said dimethylhomopiperazine.

5. A process for the preparation of methylhomopiperazine which comprises the reductive cyclization of an N(2-cyanoethyl)ethylenediamine under a pressure of from about 75 to about 2,400 pounds per square inch gauge and a temperature of from about 80° to about 130° C. in the presence of hydrogen, an inert diluent and from about 1 to about 100 weight percent based on the said N(2-cyanoethyl)ethylenediamine of a nickel-containing hydrogenation catalyst for a period of time to make optimum the conversion of the N(2-cyanoethyl)ethylenediamine to form the said methylhomopiperazine and thereafter recovering the said methylhomopiperazine.

6. A process for the preparation of homopiperazine which comprises the reductive cyclization of N(2-cyanoethyl)-ethylenediamine under a pressure of from about 75 to about 2,400 pounds per square inch gauge and a temperature of from about 80° to about 130° C. in the presence of hydrogen, an inert diluent and from about 1 to about 100 weight precent based on said N(2-cyanoethyl)ethylenediamine of a nickel-containing hydrogenation catalyst for a period of time to make optimum the conversion of the N(2-cyanoethyl)ethylenediamine to form the said homopiperazine and thereafter recovering the said homopiperazine.

7. A process for the preparation of 1-methylhomopiperazine which comprises the reductive cyclization of N(2-cyanoethyl)-N-methylethylenediamine under a pressure of from about 75 to about 2,400 pounds per square inch gauge and a temperature of from about 80° to about 130° C. in the presence of hydrogen, an inert diluent and from about 1 to about 100 weight percent based on the said N(2-cyanoethyl)-N-methylethylenediamine of a nickel-containing hydrogenation catalyst for a period of time to make optimum the conversion of the N(2-cyanoethyl)-N-methylethylenediamine to form the said 1-methylhomopiperazine and thereafter recovering the said 1-methylhomopiperazine.

8. A process for the preparation of 2-methylhomopiperazine which comprises the reductive cyclization of N(2-cyanoethyl)-1,2-propanediamine under a pressure of from about 75 to about 2,400 pounds per square inch gauge and a temperature of from about 80° to about 130° C. in the presence of hydrogen, an inert diluent and from about 1 to about 100 weight percent based on the said N(2-cyanoethyl)-1,2-propanediamine of a nickel-containing hydrogenation catalyst for a period of time to make optimum the conversion of the N(2-cyanoethyl)-1,2-propanediamine to form the said 2-methylhomopiperazine and thereafter recovering the said 2 methylhomopiperazine.

9. A process for the preparation of 5-methylhomopiperazine which comprises the reductive cyclization of N(1-methyl-2-cyanoethyl)ethylenediamine under a pressure of from about 75 to about 2,400 pounds per square inch gauge and a temperature of from about 80° to about 130° C. in the presence of hydrogen, an inert diluent and from about 1 to about 100 weight percent based on the said N(1-methyl-2-cyanoethyl)ethylenediamine of a nickel-containing hydrogenation catalyst for a period of time to make optimum the conversion of the N(1-methyl-2-cyanoethyl)ethylenediamine to form the said 5-methylhomopiperazine and thereafter recovering the said 5-methylhomopiperazine.

10. A process for the preparation of 6-methylhomopiperazine which comprises the reductive cyclization of N(2-methyl-cyanoethyl)ethylenediamine under a pressure of from about 75 to about 2,400 pounds per square inch gauge and a temperature of from about 80° to about 130° C. in the presence of hydrogen, an inert diluent and from about 1 to about 100 weight percent based on the said N(2-methyl-2-cyanoethyl)ethylenediamine of a nickel-containing hydrogenation catalyst for a period of time to make optimum the conversion of the N(2-methyl-2-cyanoethyl)ethylenediamine to form the said 6-methylhomopiperazine and thereafter recovering the said 6-methylhomopiperazine.

References Cited in the file of this patent

FOREIGN PATENTS 1,047,785　　Germany _____ Dec. 31, 1918

OTHER REFERENCES

McElvain et al.: Jour. Amer. Chem. Soc., vol. 76, pp. 1126–1137 (1954).